United States Patent
Diamant et al.

(10) Patent No.: US 10,708,246 B1
(45) Date of Patent: Jul. 7, 2020

(54) EXTENDING CRYPTOGRAPHIC-KEY LIFESPAN IN NETWORK ENCRYPTION PROTOCOLS

(71) Applicant: Amazon Technologies, Inc., Seattle, WA (US)

(72) Inventors: Ron Diamant, Albany, CA (US); Noa Yehezkel, Kiryat Ono (IL); Ahmad Erew, Jatt (IL); Jonathan Cohen, Haifa (IL); Michael Baranchik, Natanya (IL)

(73) Assignee: Amazon Technologies, Inc., Seattle, WA (US)

( * ) Notice: Subject to any disclaimer, the term of this patent is extended or adjusted under 35 U.S.C. 154(b) by 204 days.

(21) Appl. No.: 15/836,292

(22) Filed: Dec. 8, 2017

(51) Int. Cl.
*H04L 29/06* (2006.01)
*G06F 9/455* (2018.01)
*H04L 12/801* (2013.01)
*H04L 12/861* (2013.01)

(52) U.S. Cl.
CPC ...... *H04L 63/0485* (2013.01); *G06F 9/45558* (2013.01); *H04L 47/34* (2013.01); *H04L 49/9057* (2013.01)

(58) Field of Classification Search
CPC .................................................. H04L 63/485
USPC ....................................................... 713/153
See application file for complete search history.

(56) References Cited

U.S. PATENT DOCUMENTS

| | | | | |
|---|---|---|---|---|
| 6,055,316 A * | 4/2000 | Perlman | ................ | H04L 9/0637 380/262 |
| 10,212,138 B1 * | 2/2019 | Diamant | ............. | H04L 63/0428 |
| 2003/0131233 A1 * | 7/2003 | Garstin | ..................... | H04L 9/12 713/160 |
| 2014/0344957 A1 * | 11/2014 | Muller | .................. | H04L 9/0637 726/30 |

* cited by examiner

*Primary Examiner* — Jacob Lipman
(74) *Attorney, Agent, or Firm* — Kilpatrick Townsend & Stockton LLP

(57) ABSTRACT

An apparatus and a corresponding method. The apparatus includes an injection module operable to maintain packet sequence numbers for a group of network devices, receive a first packet and a second packet that is sent from the apparatus after the first packet and destined for a different device in the group than the first packet, and update the packets with different packet sequence numbers. The packet sequence number for the second packet is generated using the packet sequence number for the first packet. The apparatus further includes an encryption module operable to determine an initialization vector for each packet sequence number and apply an encryption algorithm to each packet. Each packet is encrypted using a corresponding initialization vector and an encryption key as inputs to the encryption algorithm.

20 Claims, 8 Drawing Sheets

US 10,708,246 B1

EXTENDING CRYPTOGRAPHIC-KEY LIFESPAN IN NETWORK ENCRYPTION PROTOCOLS

BACKGROUND

Computer networks often use an encryption protocol for encrypting communications between devices. Some examples of encryption protocols are Internet Protocol security (IPSec), Transport Layer Security (TLS), and Datagram Transport Layer Security (DTLS). Encryption protocols sometimes use an initialization vector (IV), also known as a starting variable, as an input to a cryptographic algorithm. The IV is a unique piece of information which ensures that data units being transmitted are encrypted differently, even if the data units are encrypted using the same encryption key and contain identical information. This prevents the underlying data from being inferred by an interceptor of the encrypted data, for example, by recognizing a pattern of encrypted data during repeated transmissions of the same underlying data.

There are many ways to generate an IV. Some cryptographic algorithms require that the IV be random or pseudorandom. Irrespective of how the IV is generated, the IV is subject to size constraints and other requirements imposed by the encryption algorithm, for example, being limited to a certain number of bits. The size affects how many times an encryption key can be used in combination with the IV without compromising security. Thus the lifespan of an encryption key is limited by the IV.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In an encryption protocol, the IV can be used as an input to a cryptographic algorithm, for encrypting or decrypting data. The IV can be used in different ways depending on the algorithm. In a block cipher algorithm such as the Advanced Encryption Standard (AES) algorithm, an encryption key determines a mapping between the unencrypted data and the encrypted data, sometimes referred to as the plaintext and the ciphertext, respectively. The block cipher splits the data into blocks and each block is encrypted separately using the same key. If the plaintext blocks are identical, the resulting ciphertext is also identical. This is a security risk because a third party intercepting the ciphertext may infer the plaintext through pattern recognition, even if the third party does not have access to the encryption key and is unable to decrypt the ciphertext. To prevent patterns from being formed, the block cipher may simply use a new key for each encryption, but that would be impractical. Instead, most block ciphers will randomize the plaintext blocks, for example by adding ciphertext from one block encryption to the next plaintext block. Because ciphertext is unavailable for the first plaintext block, the randomization process is initialized by adding at least part of the IV to the first plaintext block. This is one way in which an IV can be applied as an input to an encryption algorithm.

Figure 1:
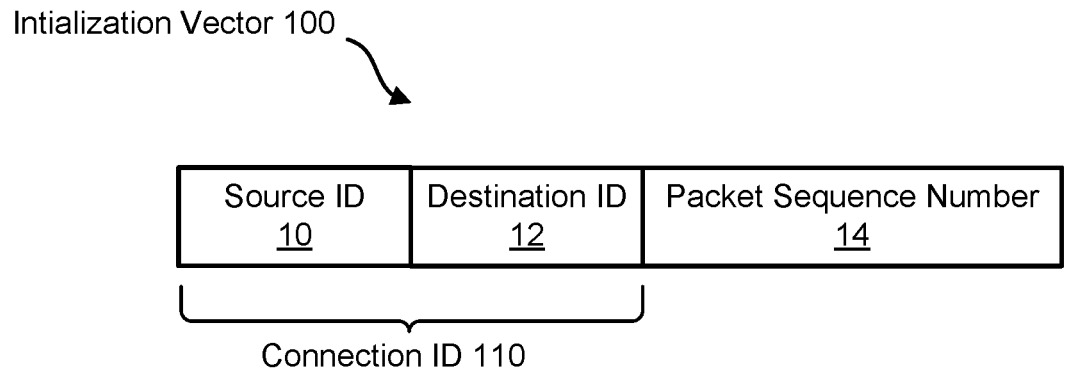
FIG. 1 illustrates an example initialization vector format.

In computer networks, data may be transmitted as packets. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. Packets are transmitted from a source device (sender) to a destination device (receiver) and are sometimes encrypted. The sender and the receiver may be physical or virtual devices. The sender and the receiver are assigned corresponding identifiers, such as Internet Protocol (IP) addresses. One simple way to form an IV is to use only the source and destination addresses. This is sufficient for encryption at the Internet layer of the Internet protocol suite, which is where IPsec operates. However, if the encryption protocol is performed at a different level, for example at a data link layer (layer 2) or a network layer (layer 3) of the Open System Interconnect (OSI) Reference Model, then additional information may be needed. This additional information, in combination with the source and destination addresses, provides a unique connection identifier (ID) for a connection between the sender and the receiver. FIG. 1 illustrates this concept.

Example embodiments are described in which an encryption key lifespan is extended by using an improved IV format in conjunction with an apparatus that maintains packet sequence numbers for a group of network devices. The apparatus receives packets destined for devices within the group. After generating a sequence number for a packet destined for a first device in the group, the apparatus generates a second sequence number for a packet destined for a second device in the group. The second sequence number is generated using the first sequence number. For each sequence number, the apparatus determines a corresponding IV that is then used to encrypt the corresponding packet. In this manner, the sequence numbers are shared among the group rather than having a separate set of sequence numbers for each sender-receiver connection.

FIG. 1 illustrates an IV 100 formed using a source ID 10, a destination ID 12, and a packet sequence number 14. A packet sequence number (PSN) is a number that identifies an order in which a packet is transmitted from a sender to a receiver. Generally, packet sequence numbers are formed by incrementing the previous sequence number by a fixed value, for example 1. The IV 100 is a digital value comprising a sequence of binary numbers, formed by concatenating the source ID 10, the destination ID 12, and the packet sequence number 14, in that order. The source ID 10 and the destination ID 12 together form a connection ID 110. To ensure security, the IV should be unique. For example, the IV 100 may be a number that is unique to a given connection between a sender and a receiver. This is true so long as the packet sequence number is not repeated for another packet transmitted over the same connection. Between different connections, uniqueness is guaranteed by the connection ID because the source ID and/or the destination ID will be different. That is, the sender may be different, the receiver may be different, or both.

The size of the IV is determined by the encryption algorithm. For example, the IV 100 may be 96 bits long. If the source ID 10 and the destination ID 12 are each 32-bit, then that leaves 32 bits for the packet sequence number 14. A problem arises when network conditions are such that the range of unique IV values, referred to herein as the IV space, is exhausted too frequently. For a 32-bit number, there are $2^{32}$ unique values. Now assume that the physical link on which traffic is sent is a 100 Gbps Ethernet link and the minimum packet size is 64 bytes. Then in the worst case scenario, where every packet is minimum sized, the amount of time it takes to exhaust the IV space is $2^{32}$ bits×64 bytes×8 bits per byte÷100 gigabits per second, or approximately 22 seconds. For illustration purposes, this calculation was performed using the International System of Units definition of giga ($10^9$) rather than the common computing definition of $1024^3$. For simplicity, this calculation also ignored the presence of additional information that needs to transmitted such as packet preambles, and interpacket gaps that need to be maintained between any two consecutive packets. To maintain security, a key exchange should take place before the IV space is exhausted. In practice, keys are periodically swapped at a frequency determined based on the expected key lifespan. In this example, the key might be swapped every 20 seconds. Frequent key swapping results in undesirable consumption of computing resources. This problem is exacerbated as network speed increases; faster speed means less time before the IV space is exhausted. Frequent key swapping is also necessitated by the way in which the packet sequence numbers are managed, as illustrated in FIG. 2.

Figure 2:
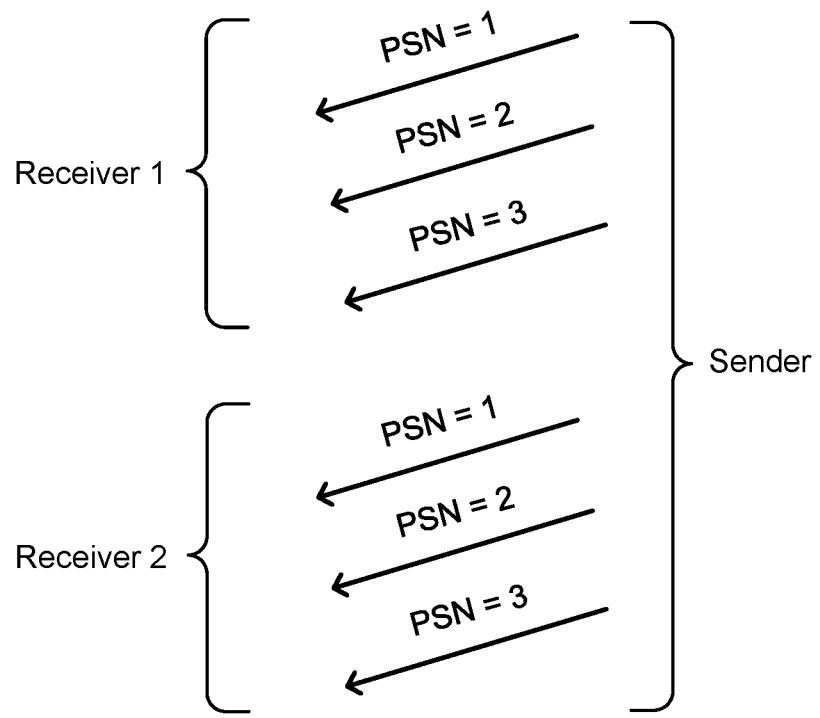
FIG. 2 illustrates an example packet sequence numbering scheme.

FIG. 2 illustrates how packet sequence numbers can be incremented for use with the IV format in FIG. 1. In FIG. 2, each sequence number is managed separately for each connection (i.e., for a specific sender-receiver pair). A first connection is represented by a set of packets sent to Receiver 1, and a second connection is represented by a set of packets sent to Receiver 2. The sender in the first connection is the same as the sender in the second connection. Each connection is assigned a separate, unique IV space according to the IV format in FIG. 1, and the sequence number is incremented by 1 for each packet received over the connection. Thus the progression of sequence numbers is 1, 2, 3 for Receiver 1. Likewise, the progression of sequence numbers for Receiver 2 is also 1, 2, 3.

The key swapping described earlier, if performed in connection with the IV format and sequence numbering scheme of FIGS. 1 and 2, is usually inherently wasteful. If all packets sent through a link are sent by a single sender, then a shorter connection ID can be used in combination with a longer sequence number, thus increasing the IV space since the sequence number wraps less often. Alternatively, if multiple senders are sharing a single link, then each sender has an effectively slower link (e.g., 100 Gbps×the percentage of time that the sender has the link), and it will take the sender more time to exhaust its IV space. Less frequent key swapping can be achieved through modifying the IV format as shown in FIG. 3 together with using a different sequence numbering scheme, such as the scheme shown in FIG. 4.

Figure 3:
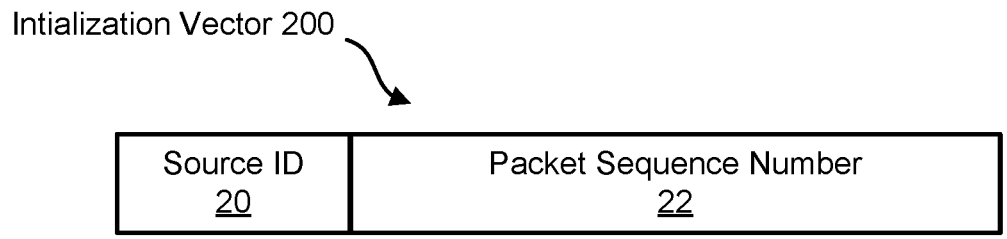
FIG. 3 illustrates an example initialization vector format according to certain aspects of the disclosure.

FIG. 3 illustrates an IV 200 in accordance with an aspect of the present disclosure. The IV 200 includes a source ID 20 and a packet sequence number 22, but no destination ID. Instead of relying on the destination ID, which is insufficient by itself to guarantee uniqueness, a unique number is formed by combining the source ID with a longer packet sequence number. Further, as will be explained in connection with FIG. 4, instead of incrementing the packet sequence number for each connection, the packet sequence number is incremented for each sender, i.e., managed on an individual sender basis. The source ID is retained because there could be multiple senders behind a network device that is sending packets, and in order to prevent the possibility of the same IV being used for two senders that send the same packet through the network device. If the IV is limited to 96 bits and the source ID 20 is 32-bit, then the omission of the destination ID permits the packet sequence number to be 64 bits long. Using the same example calculation described earlier in connection with FIG. 1, the expected key lifespan becomes approximately 3,000 years instead of 22 seconds. Thus the lifespan is dramatically extended, by a factor of $2^{64}/2^{32}$, or approximately $4\times10^9$. Details of how the packet sequence number can be generated are described below. The following section explains how the sequence number changes when incremented on an individual sender basis.

Figure 4:
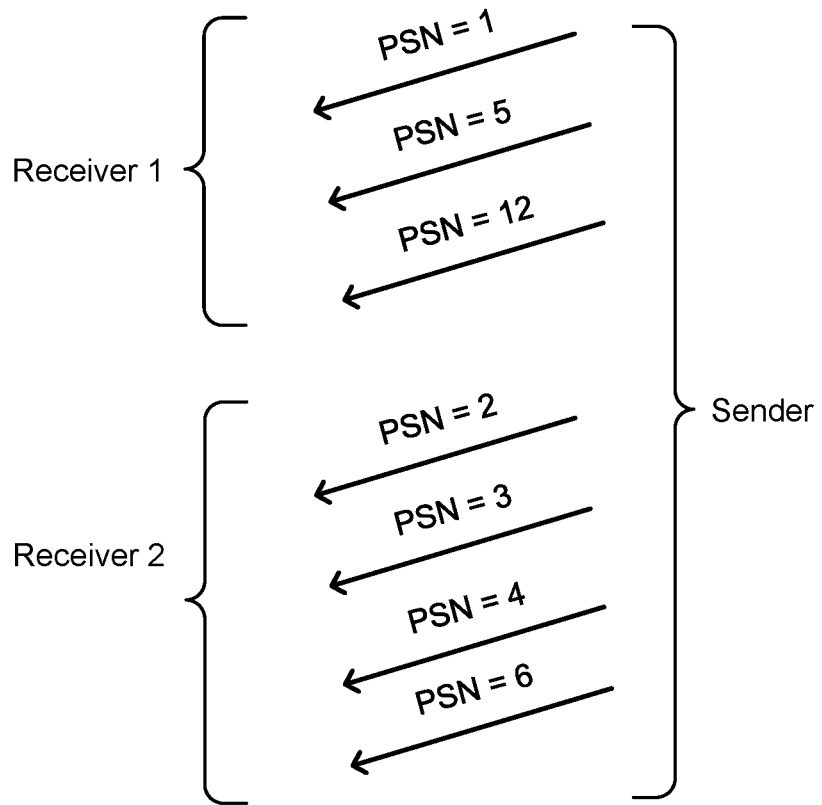
FIG. 4 illustrates an example packet sequence numbering scheme according to certain aspects of the disclosure.

FIG. 4 illustrates how packet sequence numbers can be incremented for use with the IV format of FIG. 3. In FIG. 4, each sequence number is managed on an individual sender basis, for all receivers connected to the sender. Because there is no requirement that the sequence numbers for a given connection must be incremented by 1, the sequence numbers can be incremented by any arbitrary value, so long as the sequence numbers are different for each packet in the connection. For example, the progression of sequence numbers for Receiver 1 can be 1, 5, 12 while the progression of sequence numbers for Receiver 2 can be 2, 3, 4, 6. In this way, the sequence numbers are different for each packet received by Receiver 1, and different for each packet received by Receiver 2. Further, the sequence numbers are different between Receiver 1 and Receiver 2 so that even if the sender transmits the same packet to both receivers the packets will be encrypted differently.

The packet sequence numbering scheme described above in connection with FIGS. 3 and 4 can be implemented in hardware, software, or a combination of both. The following section provides an overview of example network infrastructure as an introduction to the different ways in which packet sequence numbers and IVs can be handled in a network. In the simplest scenario, the network consists of two network devices, each forming a node in the network: a sender and a receiver. Each network device may include a network interface module, which can be a physical network interface controller or a virtual network interface. The encryption protocol may be implemented by software executed by a processor of the network device. Alternatively, the encryption protocol may be hardware implemented, for example by the network interface module. The network interface module may add an IV and/or a packet sequence number to each outgoing packet prior to encryption. For example, the sequence number may be added to the packet payload or as control information separate from the payload. In some implementations, each packet has one or more reserved fields into which the sequence number or IV assigned to the packet is written.

Figure 5:
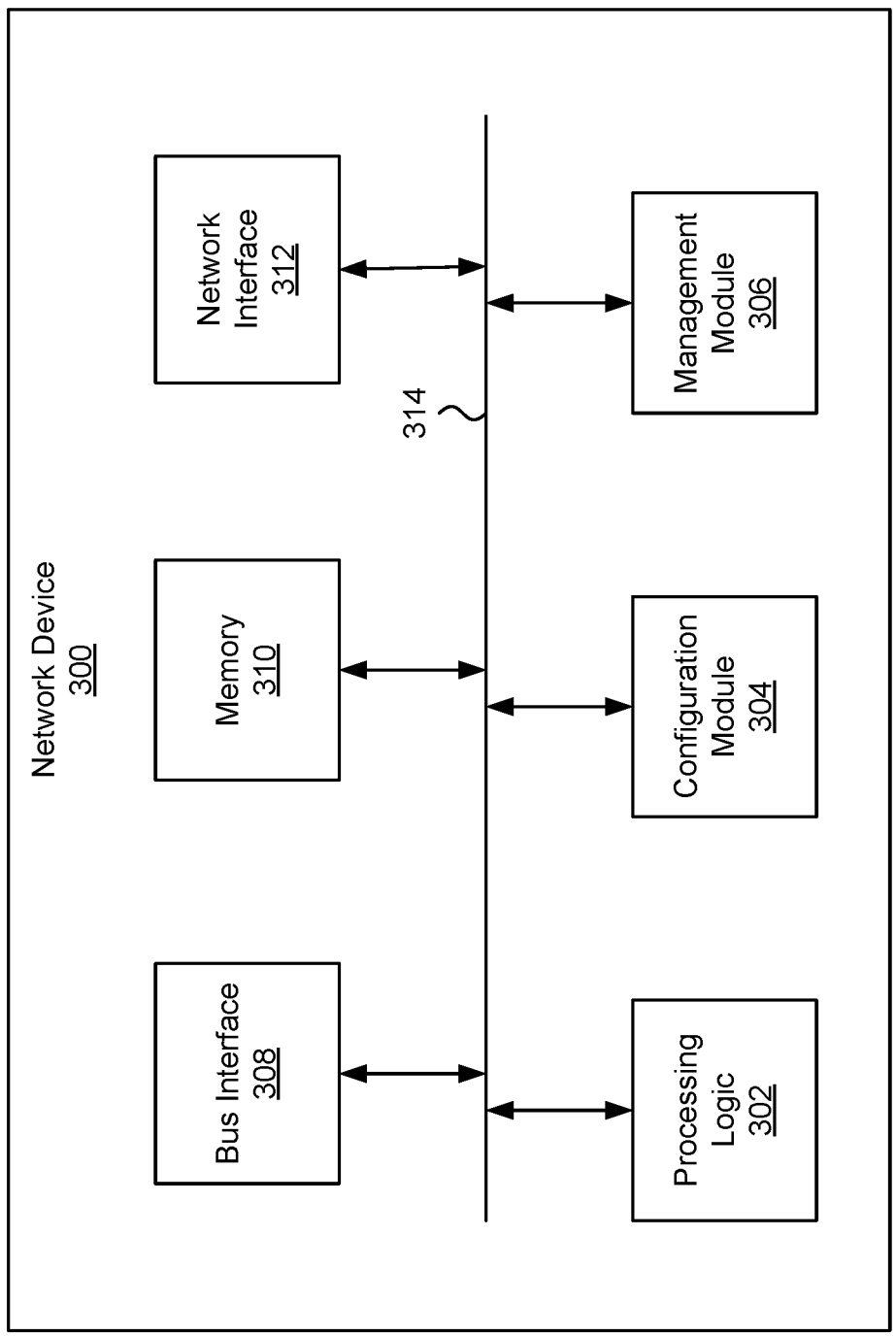
FIG. 5 illustrates an example network device, according to certain aspects of the disclosure.

FIG. 5 illustrates an example of a network device 300. Functionality and/or several components of the network device 300 may be used without limitation with other embodiments disclosed elsewhere in this disclosure, without limitations. The network device 300 may facilitate processing of packets and/or forwarding of packets from the network device 300 to another device. In some implementations, the network device 300 may be the recipient and/or generator of packets. In some implementations, the network device 300 may modify the contents of the packet before forwarding the packet to another device. The network device 300 may be a peripheral device coupled to another computer device, a switch, a router or any other suitable device enabled for receiving and forwarding packets.

In one example, the network device 300 may include processing logic 302, a configuration module 304, a management module 306, a bus interface module 308, memory 310, and a network interface module 312. These modules may be hardware modules, software modules, or a combination of hardware and software. In certain instances, modules may be interchangeably used with components or engines, without deviating from the scope of the disclosure. The network device 300 may include additional modules, not illustrated here, such as components discussed with respect to the nodes disclosed in FIG. 6. In some implementations, the network device 300 may include fewer modules. In some implementations, one or more of the modules may be combined into one module. One or more of the modules may be in communication with each other over a communication channel 314. The communication channel 314 may include one or more busses, meshes, matrices, fabrics, a combination of these communication channels, or some other suitable communication channel.

The processing logic 302 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 302 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 302 may be stored on a computer-readable storage medium, for example, in the form of a computer program. The computer-readable storage medium may be non-transitory. In some cases, the computer-readable medium may be part of the memory 310.

The memory 310 may include either volatile or non-volatile, or both volatile and non-volatile types of memory. The memory 310 may, for example, include random access memory (RAM), read only memory (ROM), Electrically Erasable Programmable Read-Only Memory (EEPROM), flash memory, and/or some other suitable storage media. In some cases, some or all of the memory 310 may be internal to the network device 300, while in other cases some or all of the memory may be external to the network device 300. The memory 310 may store an operating system comprising executable instructions that, when executed by the processing logic 302, provides the execution environment for executing instructions providing networking functionality for the network device 300. The memory may also store and maintain several data structures and routing tables for facilitating the functionality of the network device 300.

In some implementations, the configuration module 304 may include one or more configuration registers. Configuration registers may control the operations of the network device 300. In some implementations, one or more bits in the configuration register can represent certain capabilities of the network device 300. Configuration registers may be programmed by instructions executing in the processing logic 302, and/or by an external entity, such as a host device, an operating system executing on a host device, and/or a remote device. The configuration module 304 may further include hardware and/or software that control the operations of the network device 300.

In some implementations, the management module 306 may be configured to manage different components of the network device 300. In some cases, the management module 306 may configure one or more bits in one or more configuration registers at power up, to enable or disable certain capabilities of the network device 300. In certain implementations, the management module 306 may use processing resources from the processing logic 302. In other implementations, the management module 306 may have processing logic similar to the processing logic 302, but segmented away or implemented on a different power plane than the processing logic 302.

The bus interface module 308 may enable communication with external entities, such as a host device and/or other components in a computing system, over an external communication medium. The bus interface module 308 may include a physical interface for connecting to a cable, socket, port, or other connection to the external communication medium. The bus interface module 308 may further include hardware and/or software to manage incoming and outgoing transactions. The bus interface module 308 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 308 may include the physical layer for any of these bus protocols, including a connector, power management, and error handling, among other things. In some implementations, the network device 300 may include multiple bus interface modules for communicating with multiple external entities. These multiple bus interface modules may implement the same local bus protocol, different local bus protocols, or a combination of the same and different bus protocols.

The network interface module 312 may include hardware and/or software for communicating with a network. This network interface module 312 may, for example, include physical connectors or physical ports for wired connection to a network, and/or antennas for wireless communication to a network. The network interface module 312 may further include hardware and/or software configured to implement a network protocol stack. The network interface module 312 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 300 may include multiple network interface modules, each configured to communicate with a different network. For example, in these implementations, the network device 300 may include a network interface module for communicating with a wired Ethernet network, a wireless 802.11 network, a cellular network, an Infiniband network, etc.

The various components and modules of the network device 300, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 6.

Figure 6:
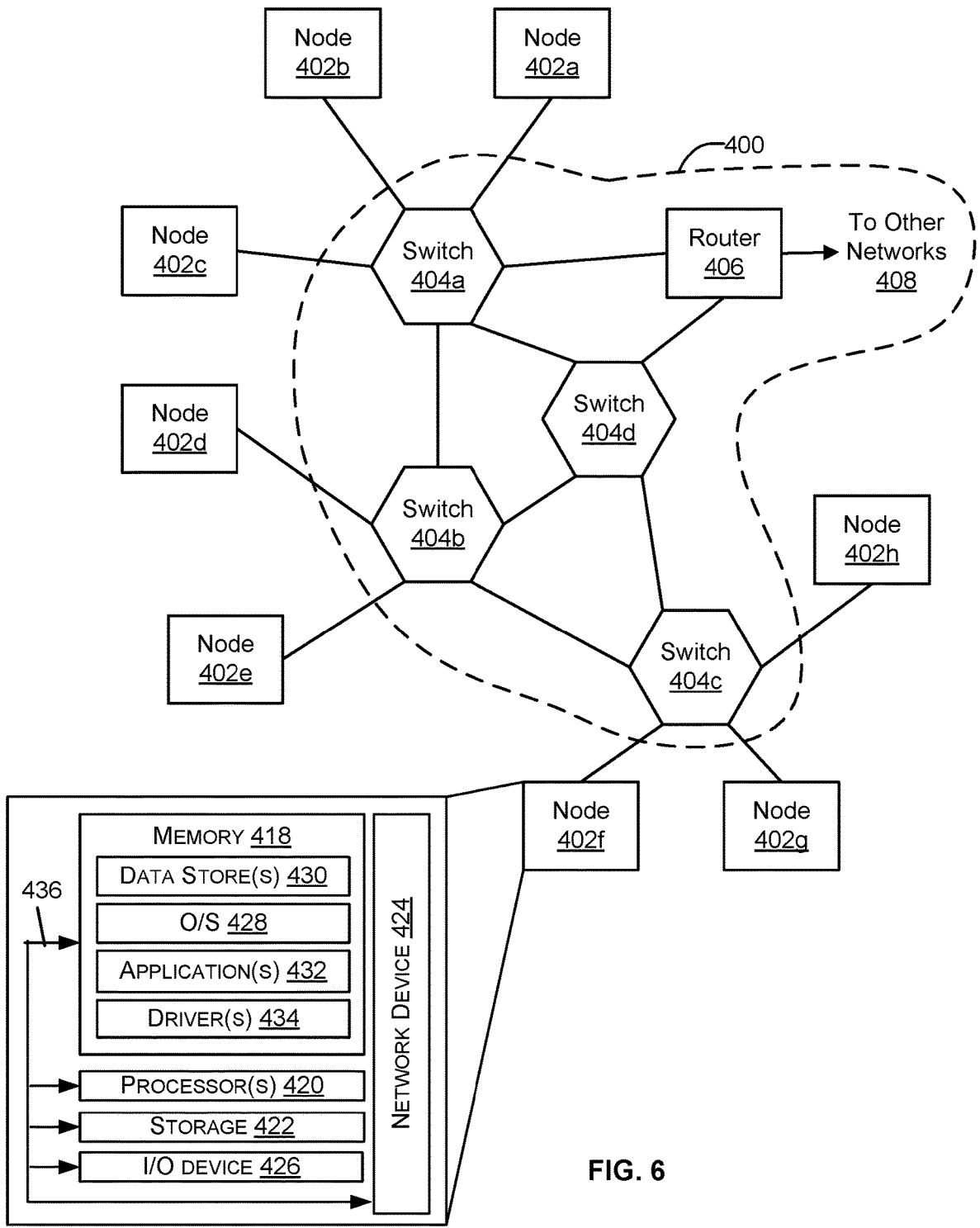
FIG. 6 illustrates an example architecture for features and systems described herein that includes one or more service provider computers and/or a user device connected via one or more networks, according to certain aspects of the disclosure.

FIG. 6 illustrates a network 400, illustrating various different types of network devices 300 of FIG. 5, such as nodes comprising the network device, switches and routers. In certain embodiments, the network 400 may be based on a switched architecture with point-to-point links. As illustrated in FIG. 6, the network 400 includes a plurality of switches 404a-404d, which may be arranged in a network. In some cases, the switches are arranged in a multi-layered network, such as a Clos network. A network device 400 that filters and forwards packets between local area network (LAN) segments may be referred to as a switch. Switches generally operate at the data link layer (layer 2) and sometimes the network layer (layer 3) of the OSI Reference Model and may support several packet protocols. Switches 404a-404d may be connected to a plurality of nodes 402a-402h and provide multiple paths between any two nodes.

The network 400 may also include one or more network devices 300 for connection with other networks 408, such as other subnets, LANs, wide area networks (WANs), or the Internet, and may be referred to as routers 406. Routers use headers and forwarding tables to determine the best path for forwarding the packets, and use protocols such as internet control message protocol (ICMP) to communicate with each other and configure the best route between any two devices.

In some examples, network(s) 400 may include any one or a combination of many different types of networks, such as cable networks, the Internet, wireless networks, cellular networks and other private and/or public networks. Interconnected switches 404a-404d and router 406, if present, may be referred to as a switch fabric, a fabric, a network fabric, or simply a network. In the context of a computer network, terms "fabric" and "network" may be used interchangeably herein.

Nodes 402a-402h may be any combination of host systems, processor nodes, storage subsystems, and I/O chassis that represent user devices, service provider computers or third party computers.

User devices may include computing devices to access an application 432 (e.g., a web browser or mobile device application). In some aspects, the application 432 may be hosted, managed, and/or provided by a computing resources service or service provider. The application 432 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 408. Additionally, the user device(s) may be part of the distributed system managed by, controlled by, or otherwise part of the service provider computer(s) (e.g., a console device integrated with the service provider computers).

The node(s) of FIG. 6 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 432 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 402a-402h may include at least one memory 418 and one or more processing units (or processor(s) 420). The processor(s) 420 may be implemented in hardware, computer-executable instructions, firmware, or combinations thereof. Computer-executable instruction or firmware implementations of the processor(s) 420 may include computer-executable or machine-executable instructions written in any suitable programming language to perform the various functions described.

In some instances, the hardware processor(s) 420 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 418 may store program instructions that are loadable and executable on the processor(s) 420, as well as data generated during the execution of these programs. Depending on the configuration and type of the node(s) 402a-402h, the memory 418 may be volatile (such as RAM) and/or non-volatile (such as ROM, flash memory, etc.). The memory 418 may include an operating system 428, one or more data stores 430, one or more application programs 432, one or more drivers 434, and/or services for implementing the features disclosed herein.

The operating system 428 may support nodes 402a-402h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 428 may also be a proprietary operating system.

The data stores 430 may include permanent or transitory data used and/or operated on by the operating system 428, application programs 432, or drivers 434. Examples of such data include web pages, video data, audio data, images, user data, and so on. The information in the data stores 430 may, in some implementations, be provided over the network(s) 408 to user devices 404. In some cases, the data stores 430 may additionally or alternatively include stored application programs and/or drivers. Alternatively or additionally, the data stores 430 may store standard and/or proprietary software libraries, and/or standard and/or proprietary application user interface (API) libraries. Information stored in the data stores 430 may be machine-readable object code, source code, interpreted code, or intermediate code.

The drivers 434 include programs that may provide communication between components in a node. For example, some drivers 434 may provide communication between the operating system 428 and additional storage 422, network device 424, and/or I/O device 426. Alternatively or additionally, some drivers 434 may provide communication between application programs 432 and the operating system 428, and/or application programs 432 and peripheral devices accessible to the service provider computer. In many cases, the drivers 434 may include drivers that provide well-understood functionality (e.g., printer drivers, display drivers, hard disk drivers, Solid State Device drivers). In other cases, the drivers 434 may provide proprietary or specialized functionality.

The service provider computer(s) or servers may also include additional storage 422, which may include removable storage and/or non-removable storage. The additional storage 422 may include magnetic storage, optical disks, solid state disks, flash memory, and/or tape storage. The additional storage 422 may be housed in the same chassis as the node(s) 402a-402h or may be in an external enclosure. The memory 418 and/or additional storage 422 and their associated computer-readable media may provide non-volatile storage of computer-readable instructions, data structures, program modules, and other data for the computing devices. In some implementations, the memory 418 may include multiple different types of memory, such as SRAM, DRAM, or ROM.

The memory 418 and the additional storage 422, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 418 and the additional storage 422 are examples of computer storage media. Additional types of computer storage media that may be present in the node(s) 402a-402h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 402a-402h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 402a-402h may also include I/O device(s) 426, such as a keyboard, a mouse, a pen, a voice input device, a touch input device, a display, speakers, a printer, and the like. The node(s) 402a-402h may also include one or more communication channels 436. A communication channel 436 may provide a medium over which the various components of the node(s) 402a-402h can communicate. The communication channel or channels 436 may take the form of a bus, a ring, a switching fabric, or a network.

The node(s) 402a-402h may also contain network device(s) 424 that allow the node(s) 402a-402h to communicate with a stored database, another computing device or server, user terminals and/or other devices on the network(s) 400. The network device(s) 424 of FIG. 6 may include similar components discussed with reference to the network device 300 of FIG. 5.

In some implementations, the network device 424 is a peripheral device, such as a PCI-based device. In these implementations, the network device 424 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 308 may implement NVMe, and the network device 424 may be connected to a computing system using a PCIe interface.

A PCI-based device may include one or more functions. A "function" describes operations that may be provided by the network device 424. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 424 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

As mentioned earlier, the packet sequence numbers can be managed on an individual sender basis, for example in the network interface module 312 of a network device 300 when there is only one sender and one receiver. In a more complex deployment scenario where there are many senders and receivers (e.g., multiple nodes 402a-402h within multiple networks 400), it would be preferable to have centralized management of packet sequence numbers. In general, sender nodes are aware of the packet sequence numbers of packets that they send, but are unaware of sequence numbers of packets from other senders. Likewise, receiver nodes are unaware of sequence numbers of packets received by other receivers. Therefore, although it is certainly possible to have each sender manage its own sequence numbers, it would be more efficient to have a central entity handle the sequence number assignments for all the senders in a given network. This makes sense if the objective is to maximize key lifespan for the link as a whole, given that the senders within a network would be sharing a common link. Accordingly, one implementation involves a central entity that assigns sequence numbers to outgoing packets of a network. The central entity may be part of, or in communication with, a server hosting a group of network devices that form the network. For example, the central entity may be a network interface controller in the server or a network device connected to the server, for example a router.

Figure 7:
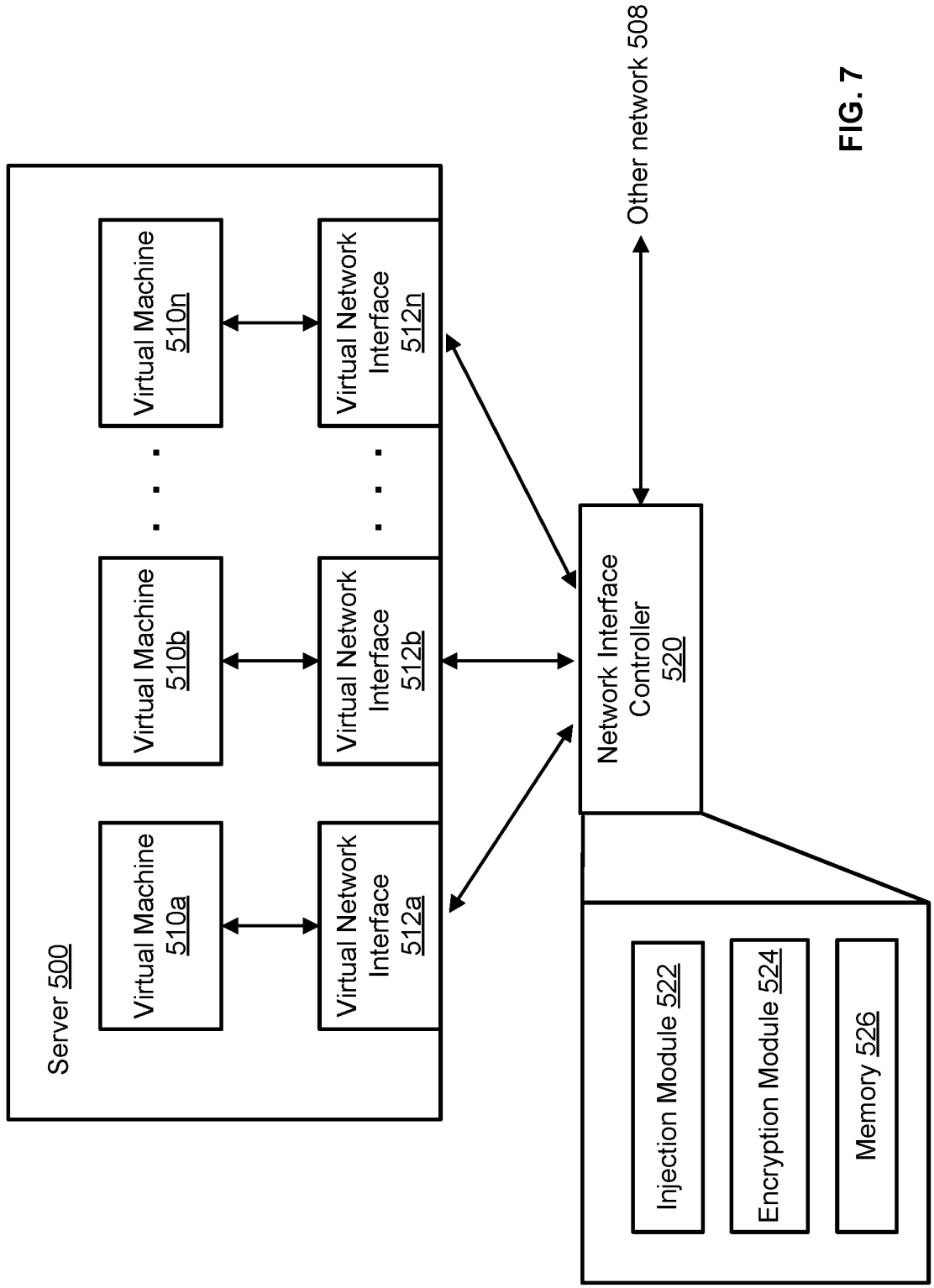
FIG. 7 illustrates an example network environment according to certain aspects of the disclosure.

In some implementations, the central entity is a virtual private network (VPN) server or a network device connected to a VPN server. For example, the network 400 may be a VPN that includes a VPN server connected to the router 406 to handle traffic for the nodes 402a-402h, including handling encryption and assignment of packet sequence numbers. The VPN server operates as an interface between the nodes 402a-402h and the other networks 408. In this scenario, the central entity could be the VPN server itself or a network device connected to the VPN server, such as the router 406. FIG. 7 illustrates another networking environment in which centralized management of packet sequence numbers would be advantageous.

FIG. 7 illustrates an example of a virtual network environment including a server 500. The server 500 hosts multiple virtual machines 510a-510n. Each virtual machine 510a-510n emulates a computer device in software. The virtual machines may run on the same platform or operating system. Alternatively, as mentioned earlier, each virtual machine may be configured to execute its own operating system. The virtual machines 510a-510n are assigned corresponding virtual network interfaces 512a-512n, which are analogous to network interface module 312 in FIG. 5. Thus, the virtual network interfaces may include virtual ports for communicating with other network devices, including other virtual machines, and may implement various network protocols.

The server 500 is connected to a network interface controller 520 which may be implemented as a hardware device. The network interface controller 520 may be a component of the server 500 or an external device connected to the server 500 by one or more communication channels including one or more busses, meshes, matrices, fabrics, a combination of these communication channels, or some other suitable communication channel. In one implementation, the virtual machines 510a-510n communicate with the network interface controller 520 through a single, shared communication channel. In another implementation, each virtual machine communicates with the network interface controller 520 through a separate channel. The network interface controller 520 operates as the central entity for managing sequence numbers for packets sent by the virtual machines 510a-510n. The network interface controller 520 operates at the physical layer of the OSI Reference Model and is connected to the physical transmission medium (e.g., a cable or wire) through which packets are sent from the server 500 to another network 508 such as a LAN or WAN. The capabilities of the network interface controller 520 may overlap with those of the virtual network interfaces 512a-512n. For example, the network interface controller 520 and the virtual network interfaces 512a-512n may each be capable of performing encryption and decryption of data packets. However, to facilitate centralized management of packet sequence numbers, the network interface controller 520 may be configured to implement an encryption protocol on behalf of the virtual machines, relieving the virtual network interfaces from the responsibility of encrypting and decrypting packets.

The network interface controller 520 may include an injection module 522, an encryption module 524, and a memory 526. The modules 522 and 524 may be hardware modules including discrete or integrated circuits, processors, programmable logic, etc. The injection module 522 updates the packet sequence number each time a packet is sent from one of the virtual machines to a device outside the network, and injects the packet sequence number into the packet. The packet sequence number is stored in the memory 526, which may be integrated into the injection module 522 or an external memory communicatively coupled to the injection module 522. The encryption module 524 encrypts packets by applying an encryption algorithm, using an initialization vector determined based on the source ID of the sender and the packet sequence number assigned to the packet by the injection module 522.

Figure 8:
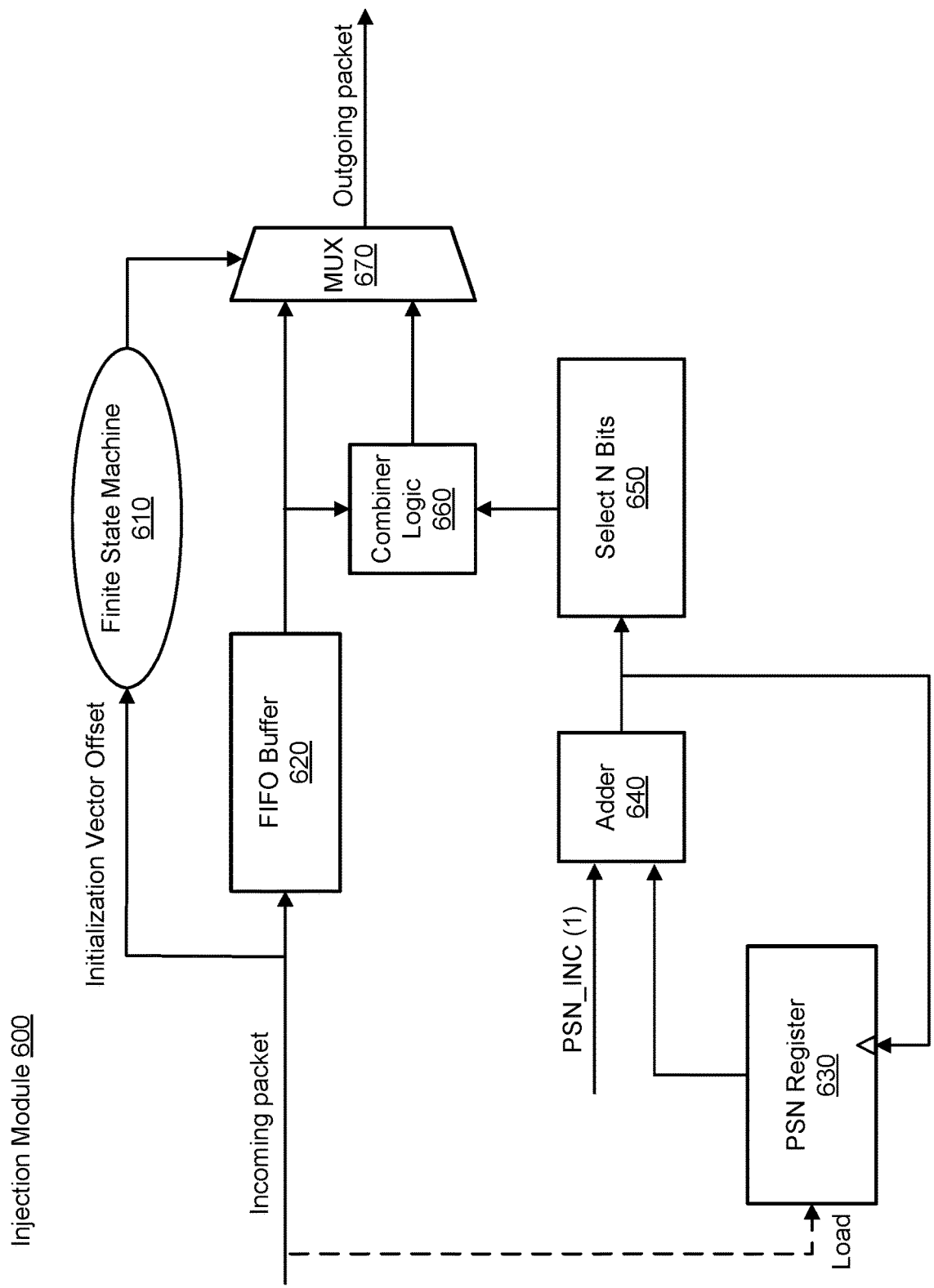
FIG. 8 illustrates an example hardware module for injecting packet sequence numbers into packets, according to certain aspects of the disclosure.

FIG. 8 illustrates an injection module 600 for injecting packet sequence numbers into outgoing packets. The injection module 600 is implemented in hardware and may be located in a network device that manages packet sequence numbers for an individual sender or in a central entity that manages packet sequence numbers for all the senders in a given link. For example, the injection module 600 can be a component of the network interface controller 520 or a component of a network interface controller associated with a VPN server that hosts the node(s) in a network 400. Although some embodiments implement packet sequence number injection using software, the hardware approach represented by the injection module 600 is easier to implement in some cases, in part because the injection can take place shortly before the packets are sent out on the physical transmission medium, with minimal reconfiguration of existing components. A similar injection process can be achieved in software, for example, though appropriate configuration of a hypervisor that manages the virtual machines of a server.

The injection module 600 includes a finite state machine (FSM) 610, a first-in, first-out (FIFO) buffer 620, a PSN register 630, an adder 640, a bit selector 650, combiner logic 660, and a multiplexer 670. The FSM 610 receives an incoming packet destined for a device outside the network. The FSM 610 determines, based on metadata in the incoming packet, whether to inject a packet sequence number into the incoming packet. The FSM 610 transitions between different states, including a first state in which the incoming packet is transmitted as is (without sequence number injection) and a second state in which a sequence number is injected into the packet to form an outgoing packet. The injection module 600 is configured to inject the sequence number into an unencrypted packet to form the outgoing packet, then provides the outgoing packet to an encryption module of the network device or central entity, e.g., the encryption module 524. The encryption module would then encrypt the outgoing packet using an initialization vector computed from the initialization vector that was injected into the outgoing packet. Alternatively, in some implementations, an injection module may receive, as the incoming packet, an encrypted packet from the encryption module and inject the initialization vector into the encrypted packet to form the outgoing packet for transmission.

The FIFO buffer 620 places the incoming packet into a queue, delaying the incoming packet to allow sufficient time for the packet sequence number to be updated, if necessary. Packets exit the queue in the same order as they enter.

The PSN register 630 operates as a running counter that stores the current packet sequence number. The maximum value the counter can store may be equal to the maximum packet sequence number permitted by the encryption protocol. When the counter is incremented beyond the maximum value, it will wrap around to the beginning of the packet sequence number range. The PSN register 630 receives a load control signal derived from metadata of the incoming packet. If the metadata indicates that the packet needs to be encrypted, then the load control signal will instruct the PSN register 630 to output its value to the adder 640.

The adder 640 is configured to receive the sequence number value from the PSN register 630 and compute a new sequence number as the sum of the sequence number value and an increment operand, PSN_INC. The increment operand can be any configurable value; a value of 1 is shown for illustration purposes. The adder 640 outputs the sum to the bit selector 650. The sum is also output to the PSN register 630 to update the current packet sequence number stored in the PSN register 630.

The bit selector 650 is configured to select N number of bits from the new sequence number as input to the combiner logic 660. In some implementations, the new sequence number is sent in its entirety to the combiner logic. However, it is sometimes desirable to have a shorter sequence number. For example, the sequence number can be shortened so that the lifespan of the encryption key is intentionally reduced if more frequent swapping of the encryption key is desired. The bit selector 650 enables this by providing an option to select only a portion of the new sequence number. The selected bits can be any subset of the full sequence number including, for example, the first N bits, the last N bits, the first N even bits, etc. Thus, the IV can be formed using the sequence number in its entirety or using a number derived from the sequence number.

The combiner logic 660 combines the packet coming out of the queue of the FIFO buffer 620 with the bits selected by the bit selector 650, thereby injecting the sequence number (or number derived therefrom) into the packet. The combiner logic 660 may be controlled by the FSM 610 so that the sequence number or derived number is injected into a specific location in the packet. This location may be, for example, a reserved field in the header section or in another section of the packet, and can be identified by an IV offset value contained in metadata of the incoming packet. The FSM 610 extracts the IV offset from the packet metadata and instructs the combiner to supply the sequence number to the location indicated by the offset. The combiner logic 660 can be implemented with digital logic that computes, for example, a logical OR or XOR function using the packet and the selected bits as inputs. Alternatively, the combiner logic 660 may be configured to simply overwrite the relevant portions of the packet with the selected bits. As mentioned earlier, encryption can be performed either before or after processing by the injection module 600 depending on the implementation. If the encryption is performed beforehand, the combiner logic 660 may inject the selected bits into an encrypted packet coming out of the FIFO buffer 620. For example, the offset value may indicate a header location of the encrypted packet and the combiner logic could prepend the selected bits to the header. If the encryption is performed afterwards, the combiner logic 660 may similarly inject the selected bits into the unencrypted packet.

The multiplexer 670 selects between the packet output by the FIFO buffer 620 and the modified packet output by the combiner logic 660. The selection is controlled by the FSM 610. When the incoming packet is encrypted or needs to be encrypted, the FSM 610 directs the multiplexer 670 to select the packet output by the combiner logic 660. When the incoming packet does not need to be encrypted, the FSM 610 directs the multiplexer 670 to select the packet output by the FIFO buffer 620.

Figure 9:
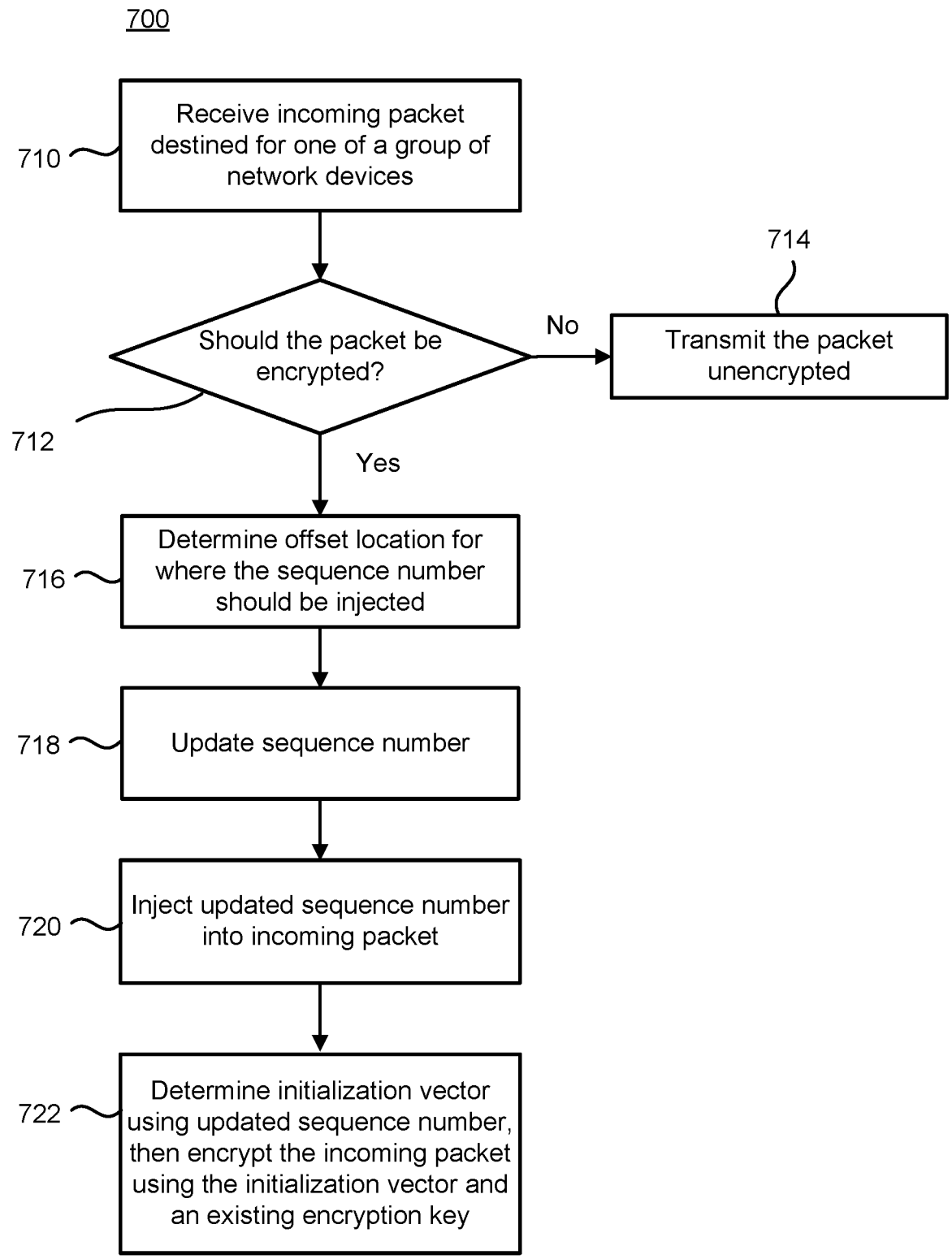
FIG. 9 is a flowchart illustrating an example process for injecting a packet sequence number into an unencrypted packet, according to certain aspects of the disclosure.
Figure 10:
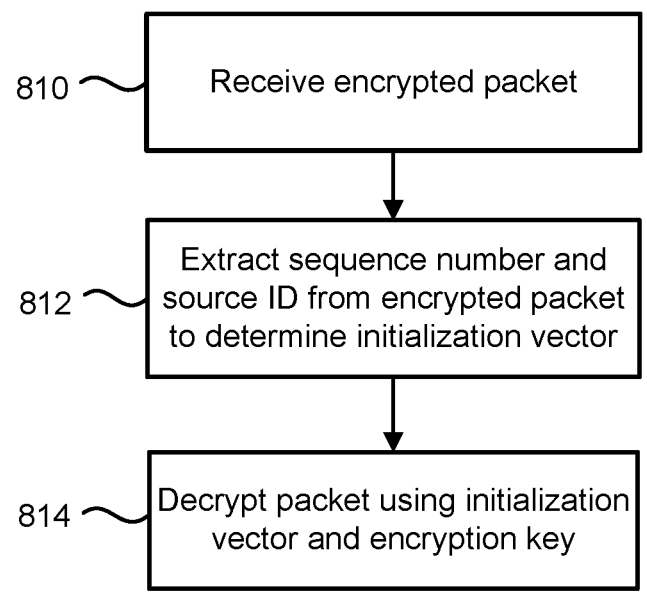
FIG. 10 is a flowchart illustrating an example process for decrypting an encrypted packet, according to certain aspects of the disclosure.

FIGS. 9 and 10 illustrate examples of methods for encrypting and decrypting packets using a packet sequence numbering scheme in accordance with the embodiments described herein. These methods may be implemented by one or more of the systems and apparatus described above, such as for example the network 400, the server 500, or the injection module 600.

FIG. 9 illustrates a method 700 for injecting a sequence number into an incoming packet that has not yet been encrypted. The method 700 can be performed by a network device configured to encrypt the incoming packet in accordance with an encryption protocol after the sequence number is injected. The network device manages sequence numbers for an individual sender or for a group of senders in the same network, so that a different sequence number is assigned each time a new packet is sent from the same sender or group of senders. At step 710, the network device receives an incoming, unencrypted packet destined for one of a group of network devices that are connected to the network device.

At step 712, the network device determines whether the incoming packet should be encrypted. The network device may make this determination based on metadata in the incoming packet, for example header information. If the packet does not need to be encrypted, the network device transmits the packet to the receiver device as is (step 714).

If the packet needs to be encrypted, then the method proceeds to step 716 and the network device determines the offset location where the sequence number should be injected. The offset location may be specified in the metadata as an initialization vector offset.

At step 718, the network device updates the sequence number, for example, using the adder 640 in FIG. 8. Other ways to update the sequence number are also possible. For example, in some implementations the sequence may be updated using a shift register, or through other mathematical operations such as subtraction or multiplication. The network device may store the updated sequence number for later use, for example for determining an initialization vector in step 722.

At step 720, the network device injects the updated sequence number (or a number derived therefrom) into the incoming packet. In some implementations, the injection occurs at a header of the packet, e.g., in a reserved field of the header. Alternatively, injection may occur at a payload of the packet, e.g., by prepending or postpending the updated sequence number to the data to be encrypted.

At step 722, the network device determines an initialization vector for the incoming packet using the updated sequence number from step 718. The initialization vector may be determined using a source ID of the incoming packet, in combination with the updated sequence number or in combination with the derived number. The network device then encrypts the incoming packet, using the initialization vector and an existing encryption key as inputs to an encryption algorithm, and transmits the encrypted packet to the receiver device. Because the receiver may need the initialization vector in order to decrypt the encrypted packet, the network device can be configured to transmit the initialization vector unencrypted, e.g., the packet portion(s) corresponding to the source ID, and the injected sequence number or derived number. Sending the initialization vector unencrypted is generally not a security concern because the role of the initialization vector is simply to ensure that the incoming packet is encrypted differently from other incoming packets, and therefore the initialization vector need not be kept secret. The initialization vector can be sent as a single piece of data. Alternatively, the source ID and the sequence number or derived number can be sent separately, e.g., in non-contiguous portions of the packet.

The network device may also be configured to estimate a lifespan of the encryption key, for example using the earlier described calculation based on network speed and sequence number length, and change to a new key prior to the end of the estimated lifespan. The network device may coordinate with one or more receivers to perform a key swap, for example, when the key is a shared secret.

FIG. 10 illustrates a method 800 for decrypting a packet that has been encrypted using an initialization vector determined according to the embodiments described herein. The method 800 may be performed by a network device that receives the encrypted packet (step 810). In some implementations, the method 800 is performed by a network interface controller of the receiver. The encrypted packet may be received directly from the network device that performs the method in FIG. 9 or routed through one or more intervening network devices or networks.

At step 812, the receiver extracts the sequence number and the source ID from the encrypted packet to determine the initialization vector that was used to encrypt the packet. The source ID and the sequence number (or the derived number) may be contained in one or more plaintext portions of the encrypted packet. For example, the complete initialization vector may be present as a continuous string of numbers in a header section of the encrypted packet. Alternatively, the source ID and the sequence number may be located in separate unencrypted sections of the encrypted packet, and the receiver may combine the source ID and the sequence number to form the initialization vector.

At step 814, the receiver decrypts the packet using the initialization vector and an encryption key as inputs to a decryption algorithm corresponding to the encryption algorithm that was used to the encrypt the packet. Depending on the encryption algorithm used, the encryption key for decrypting the packet may be the same as that which was used for encryption (e.g., a shared secret key) or a different key (e.g., a private key maintained by the receiver).

Unless expressly stated otherwise, the modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 5, FIG. 6, and/or functions described herein can be provided by one or more modules that exist as separate modules and/or module functions described herein can be spread over multiple modules.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network interface controller comprising:
   an injection module including circuitry operable to:
      maintain a packet sequence number for a group of network devices in a network, wherein the packet sequence number is assignable to packets sent by any member of the group of network devices;
      receive a first packet from a first source device in the group of network devices, the first packet being destined for a first destination device outside the network;
      generate the packet sequence number for the first packet;
      inject bits of the packet sequence number into the first packet;
      receive a second packet from a second source device in the group of network devices and after generating the packet sequence number for the first packet, the second source device being different from the first source device, and the second packet being destined for a second destination device outside the network;
      form an updated packet sequence number by incrementing the packet sequence number by a configurable value; and
      inject bits of the updated packet sequence number into the second packet; and
   an encryption module operable to:
      determine a first initialization vector by combining an identifier of the first source device with the bits of the packet sequence number;
      form a first encrypted packet by applying an encryption algorithm to the first packet, using the first initialization vector and an encryption key as inputs to the encryption algorithm;
      determine a second initialization vector by combining an identifier of the second source device with the bits of the updated packet sequence number, wherein the second initialization vector does not comprise an identifier of the second destination device; and
      form a second encrypted packet by applying the encryption algorithm to the second packet, using the second initialization vector and the encryption key as inputs to the encryption algorithm.

2. The network interface controller of claim 1, wherein the injection module further includes circuitry operable to:
   identify, from an offset value contained in the second packet, a location where the bits of the updated packet sequence number are to be injected into the second packet.

3. The network interface controller of claim 1, wherein the encryption module is further operable to:
   determine the second initialization vector by concatenating the identifier of the second source device and the bits of the updated packet sequence number.

4. An apparatus comprising:
   an injection module operable to:
      maintain packet sequence numbers for a sender device that sends packets to different network devices in a group of network devices;
      receive, from the sender device, a first packet and a second packet, the first packet being destined for a first device from the group of network devices, and the second packet being destined for a second device from the group of network devices and to be sent from the apparatus after the first packet, wherein the first device is different from the second device;
      update the first packet using a first packet sequence number from the packet sequence numbers;
      generate a second packet sequence number using the first packet sequence number, the second packet sequence number being different from the first packet sequence number; and
      update the second packet using the second packet sequence number; and
   an encryption module operable to:
      determine a first initialization vector based on the first packet sequence number and a second initialization vector based on the second packet sequence number;
      form a first encrypted packet by applying an encryption algorithm to the first packet, using the first initialization vector and an encryption key as inputs to the encryption algorithm; and form a second encrypted packet by applying the encryption algorithm to the second packet, using the second initialization vector and the encryption key as inputs to the encryption algorithm.

5. The apparatus of claim 4, wherein the injection module includes a counter that generates the second packet sequence number by incrementing the first packet sequence number by a configurable number.

6. The apparatus of claim 5, wherein the counter limits the second packet sequence number to a predefined range of number values by wrapping around to a beginning of the predefined range when the first packet sequence number is incremented beyond a highest value in the predefined range.

7. The apparatus of claim 4, wherein the injection module includes a bit selector operable to select a subset of bits from the second packet sequence number for updating the second packet.

8. The apparatus of claim 4, wherein the injection module includes combiner logic operable to use the second packet sequence number to inject a value into a specified location of the second packet.

9. The apparatus of claim 8, wherein the injection module is operable to identify the specified location from metadata in the second packet, wherein the specified location corresponds to a reserved field, and wherein the combiner logic is operable to write the value into the reserved field.

10. The apparatus of claim 4, wherein the encryption module is operable to determine the second initialization vector using only an identifier of the sender device and the second packet sequence number.

11. The apparatus of claim 4, wherein the first packet and the second packet are received from virtual machines connected to the apparatus.

12. The apparatus of claim 4, wherein the first packet and the second packet are received from a virtual private network connected to the apparatus.

13. A computer implemented method, comprising:
maintaining, by a network device, packet sequence numbers for a sender device that sends packets to different network devices in a group of network devices;
receiving, by the network device and from the sender device, a first packet and a second packet, the first packet being destined for a first device from the group of network devices, and the second packet being destined for a second device from the group of network devices and to be sent from the network device after the first packet, wherein the first device is different from the second device;
updating the first packet using a first packet sequence number from the packet sequence numbers;
generating a second packet sequence number using the first packet sequence number, the second packet sequence number being different from the first packet sequence number;
updating the second packet using the second packet sequence number; and
determining a first initialization vector, for encrypting the first packet, based on the first packet sequence number and a second initialization vector, for encrypting the second packet, based on the second packet sequence number.

14. The method of claim 13, further comprising:
determining the second initialization vector without using an identifier of the second device.

15. The method of claim 13, further comprising:
forming a first encrypted packet by applying an encryption algorithm to the first packet, using the first initialization vector and an encryption key as inputs to the encryption algorithm; and
forming a second encrypted packet by applying the encryption algorithm to the second packet, using the second initialization vector and the encryption key as inputs to the encryption algorithm.

16. The method of claim 15, further comprising:
sending the second encrypted packet to the second device together with at least part of the second initialization vector unencrypted.

17. The method of claim 15, further comprising:
estimating a lifespan of the encryption key based on a transmission speed of a network of the network device, and further based on a length of the second packet sequence number; and
changing the encryption key prior to an end of the lifespan.

18. The method of claim 13, further comprising:
responsive to determining that the second packet is to be sent to the second device encrypted, generating the second packet sequence number by incrementing the first packet sequence number by a configurable number.

19. The method of claim 13, wherein the first packet and the second packet are received from virtual machines connected to the network device.

20. The method of claim 13, wherein the first packet and the second packet are received from a virtual private network connected to the network device.

* * * * *